Aug. 16, 1932.   B. H. URSCHEL   1,872,196
TUBULAR AXLE
Filed Dec. 10, 1928   4 Sheets-Sheet 1

Inventor
Bertis H. Urschel
By Faust G. Cranston
Attorney

Aug. 16, 1932.     B. H. URSCHEL     1,872,196
TUBULAR AXLE
Filed Dec. 10, 1928     4 Sheets-Sheet 2
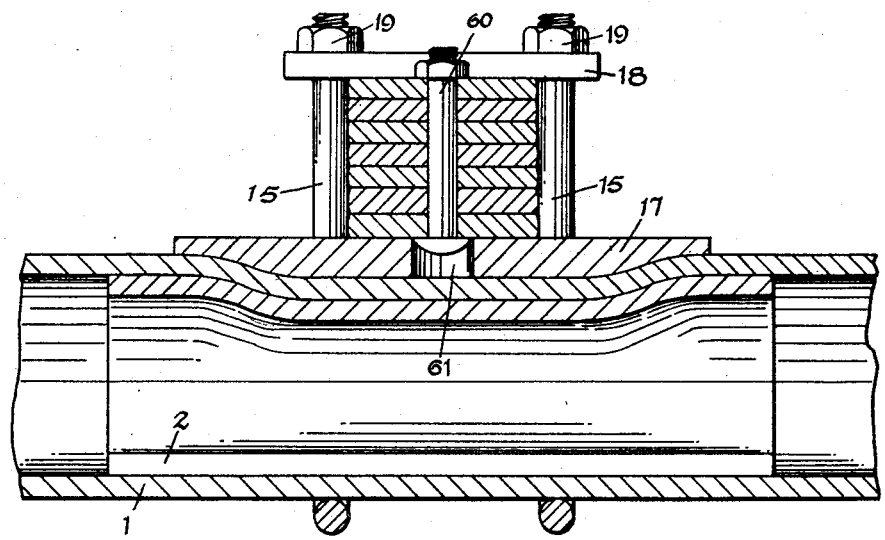
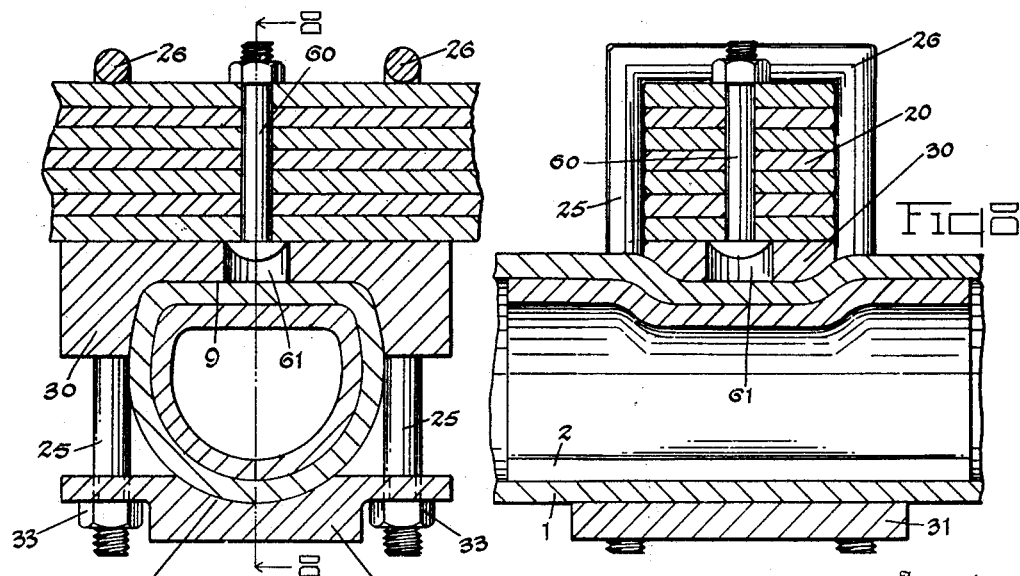
Inventor
Bertis H. Urschel
By Faust F. Crampton
Attorney

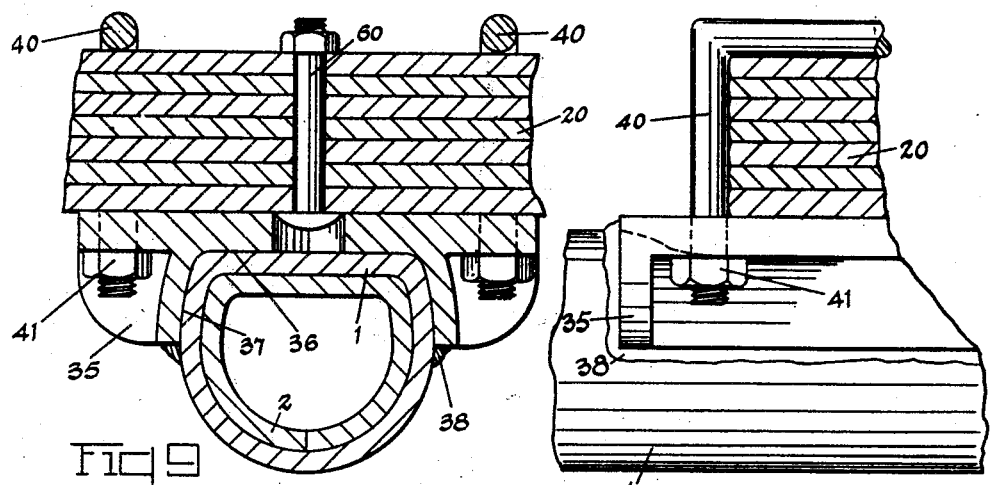

Aug. 16, 1932.  B. H. URSCHEL  1,872,196
TUBULAR AXLE
Filed Dec. 10, 1928   4 Sheets-Sheet 4

Inventor
Bertis H. Urschel
By Faust F. Crampton
Attorney

Patented Aug. 16, 1932

1,872,196

UNITED STATES PATENT OFFICE

BERTIS H. URSCHEL, OF BOWLING GREEN, OHIO, ASSIGNOR TO URSCHEL ENGINEERING COMPANY, OF TOLEDO, OHIO, A CORPORATION OF OHIO

TUBULAR AXLE

Application filed December 10, 1928. Serial No. 324,867.

My invention has for its object to provide a tubular light-weight axle for vehicles wherein the parts of the axle are so shaped that, when secured to the vehicle body, or frame, turning of the axle and longitudinal displacement of the axle, relative to the frame, will be prevented and the stresses and strains to which such axles are subjected will be withstood, notwithstanding the relatively thin walls of the tube from which the axle is formed. Preferably, the axle is formed from a cylindrical tube and is so shaped that a secure connection may be made with the frame of the vehicle and yet, notwithstanding the departure from the cylindrical form and although the wall of the tubular axle is relatively thin, yet the structure is such that it will withstand the torsional strains, due to the severe torque produced by the stud axle connections with the guiding wheels, such as of an automobile or truck, and the bending strains due to the load placed upon the axle, such as the weight of the body and frame of the vehicle and the load carried thereby and the vibratory strains due to the continuous pounding as the vehicle is driven over the road.

The invention may be contained in axle structures that vary in their details and, to illustrate a practical application of the invention, I have selected two or three forms of such structures as examples of the various embodiments of my invention and shall describe them hereinafter. The structures selected are shown in the accompanying drawings.

Figure 1:
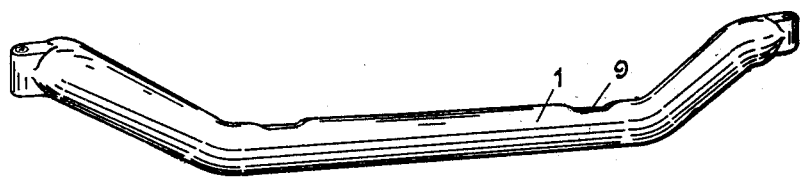
Figure 4:
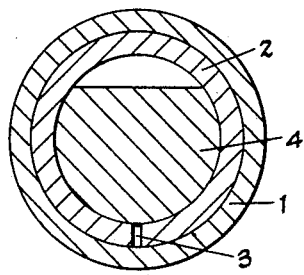
Figure 5:
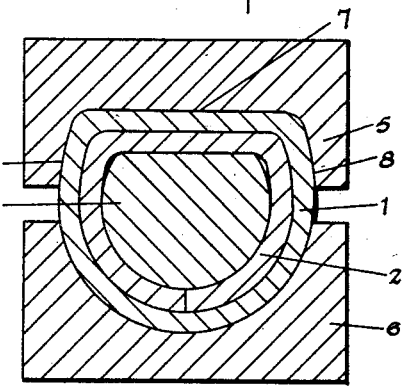
Figure 3:
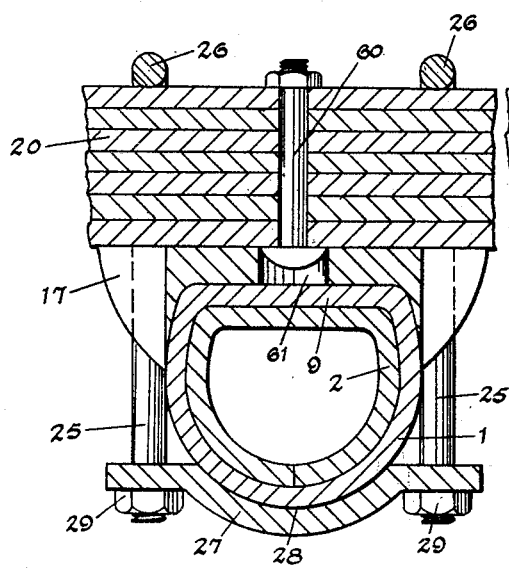
Figure 2:
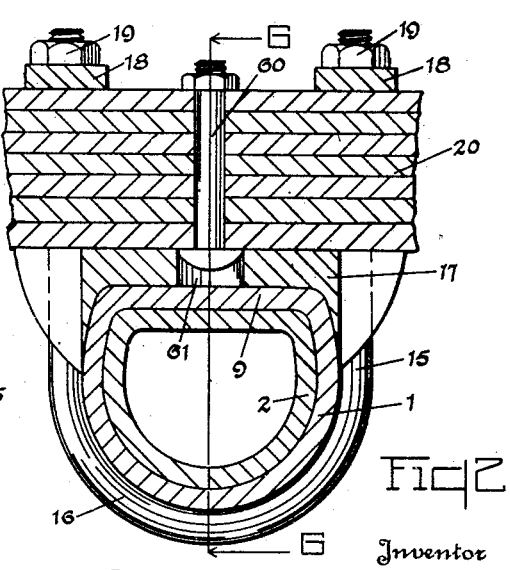
Figure 13:
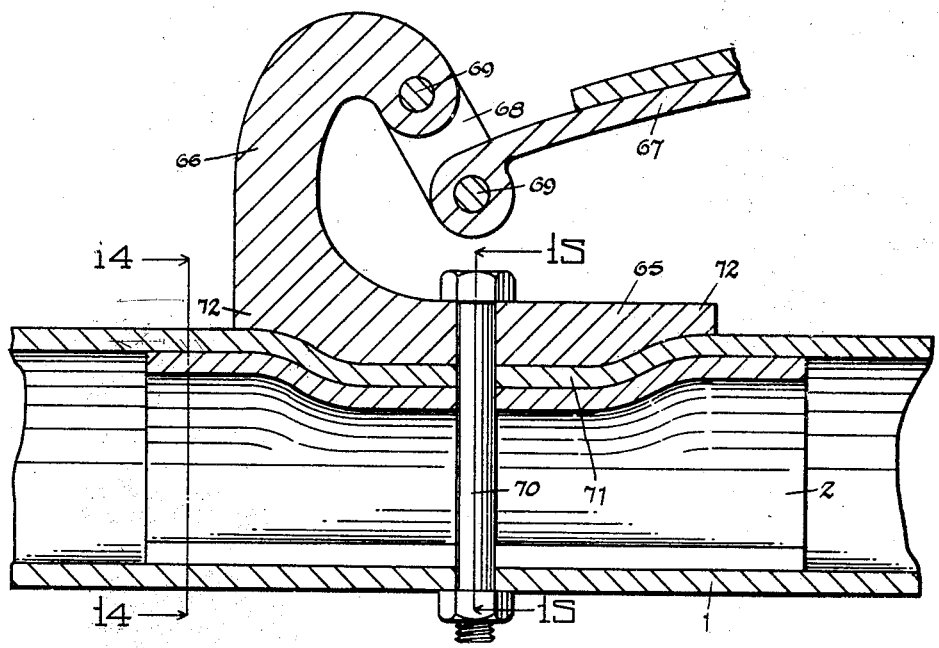
Figures 14, 15:
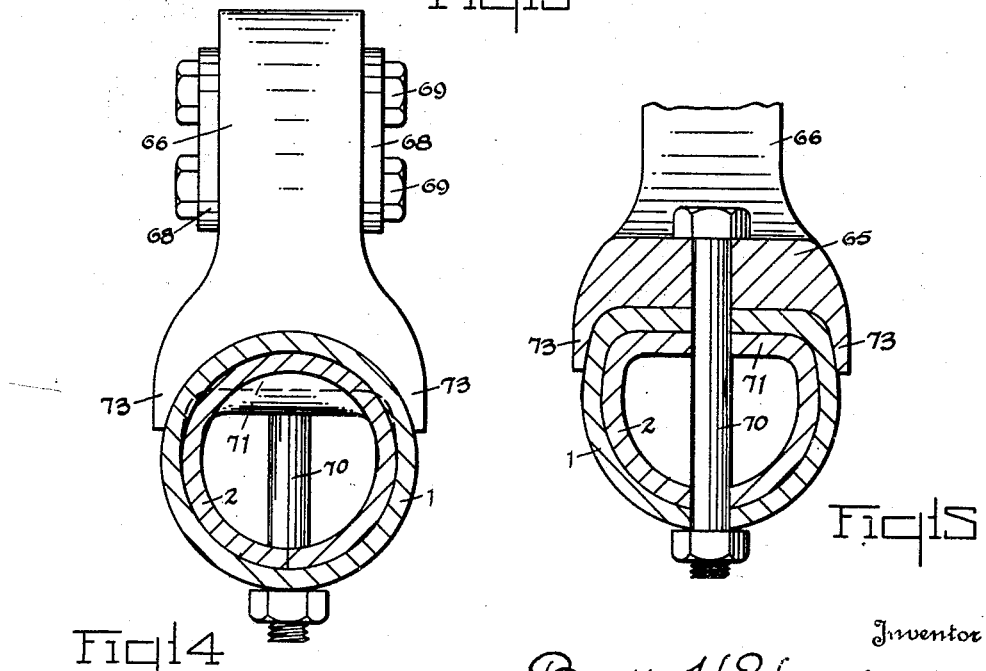

Fig. 1 is a perspective view of an axle containing the invention and having two flattened portions located on its upper side, at which points connections may be made with the springs of the vehicle. Fig. 2 illustrates a view of a transverse section of one of the said portions of the axle and illustrates the means for connecting the springs to the axle. Fig. 3 illustrates a modified form of clamping means for clamping the springs of the vehicle to the axle. Fig. 4 illustrates the position of the parts during the process of forming the axle at the point where it is connected to the vehicle. Fig. 5 illustrates the completed formation of the axle at these points. Fig. 6 is view of a section taken on the plane of the line 6—6 indicated in Fig. 2. Fig. 7 is a view of a section showing a modified form of clamp for connecting the axle to the springs of the vehicle. Fig. 8 is a view of a section taken on the plane of the line 8—8 indicated in Fig. 7. Fig. 9 is a view of a section of a further modified form of connection between the axle and the springs of the vehicle. Fig. 10 is a side view of the clamp construction shown in Fig. 9. Fig. 11 illustrates a cross section of a tubular axle wherein the part that is clamped is triangular in form. Fig. 12 illustrates a tubular axle having its part, that is clamped, formed substantially rectangular and illustrates clamping members suitable for connecting the springs of the vehicle to these parts of the tubular member. Fig. 13 illustrates a modified form of saddle which is adapted for use where the springs of vehicles are located substantially in the plane of the axle. Fig. 14 is a view of a section taken on the plane of the line 14—14 indicated in Fig. 13. Fig. 15 is a view of a section taken on the plane of the line 15—15 indicated in Fig. 13.

The particular forms of axles shown in the drawings are designed for use as the front axles of the ordinary automobile which are supported by means of the stub axles of the front wheels and, consequently, are subjected to the twisting strains that are transmitted through the wheels to the axle when running over the road and when subjected to the braking strains due to frictionally locking the wheels when the vehicle is in motion. As is well known in connection with such structures, the central portions of such axles are lowered below the level of the centers of the wheels, in order to lower the height of the frame of the vehicle, which increases the torque to which the axle is subjected at the points of connection of the springs of the vehicle to the axle. In order that the axle may withstand more efficiently the strains to which it is subjected and yet may be light in weight, it is formed cylindrical and, in order to make secure the connection between the springs of the vehicle and the axle, the axle is provided with flattened portions located only at the points of connection of the axle with the vehicle, the flattened portions being so formed that the flattened or plane surfaces are joined with the cylindrical surfaces of the body portion by curved surfaces that gradually vary in formation from the plane surfaces to the cylindrical surfaces of the body portion of the axle so as to avoid all sharp curvatures in any part of the axle in proximity to the points of connection of the axle with the springs of the vehicle. In the form of construction illustrated in Figs. 1 to 10, the points at which the axle is connected with the springs are provided with single flattened portions, the load, however, being supported not only by the plane surface of the axle at the point of connection with the spring of the vehicle, but also by the curved surfaces contiguous to the plane surface of the axle and, preferably, also by a portion of the cylindrical surface of the body of the axle. Thus, the axle is so formed that the strains to which the axle is subjected, by reason of its rigid connection with the springs of the vehicle, will be transmitted to, or carried by, portions of the axle that are so shaped as to efficiently withstand such strains. Furthermore, the points at which the axle is connected to the springs of the vehicle may be so formed that the cross sectional areas of the wall of the tubular member may be materially increased. The reduced cross sectional area of the exterior of the axle at these points provide depressed portions within the surface of the body of the axle, which prevent longitudinal displacement of the axle relative to the vehicle when the axle is clamped at these points to the vehicle springs and, since the cross sectional area of the wall of the axle at these points is maintained substantially constant, a substantially constant resistance to torsional and bending strains is also maintained at these points. Preferably, the parts of the axle to which the springs are connected are reinforced by an inner tube which is inserted in advance of the shaping of the said parts and which over-extend the parts in order to cooperate in the transmission of, and in resisting, the bending and the twisting strains as between the springs and the body of the axle.

The reinforcement is preferably formed of a tube having a wall thickness substantially the same as that of the axle and has, in advance of its formation, an exterior diameter such that short lengths of the tube may be inserted within the tube from which the axle is to be formed and located at the points where the axle is to be flattened for purposes of connecting it with the vehicle. The axle is then flattened at these points, and in flattening, the reinforcing tube is also made to conform to the interior surface of the axle at these points, which is also flattened, and, at the same time, the inner tubes are securely bound in position by the configuration of the surfaces at the points where the plane surfaces that are thus formed join with the cylindrical surfaces of the body portion of the axle. Preferably, the inner tubes used are split tubes having their opposed edges located in slightly spaced relation in advance of their being shaped within the tubular axle which permits the reduction of the area of the exterior of the axle with a corresponding increase in the thickness of the wall of the axle and at the same time provides, by reason of the elasticity of the inner tube an assured contact of the exterior surfaces of the inner tube with the inner surfaces of the axle throughout the lengths of the inner tubes.

In the formation of the axle at these points a mandrel is inserted within the inner tube, if a reinforcing tube is to be incorporated within the axle, or within the axle, if an inner tube is not to be incorporated for reinforcement purposes, and the axle with the mandrel enclosed therein is located between a pair of dies that conform to the shape into which the axle is to be formed at the points where the connection is to be made with the springs. This is illustrated in Figs. 4 and 5.

In forming the cylindrical axle 1, a straight cylindrical tube having the desired dimensions is used and, if it is to be provided with reinforcing tubes, at the point of connection of the axle with the springs, such tubes 2 are inserted through the ends of the axle in position. The tubes 2 are preferably of a length materially greater than the length of the portion of the axle that is to be flattened. Preferably, the reinforcing tube 2 is split, as at 3, the edges along the split being preferably located slightly remote from each other in order to allow for the reduced area of the interior of the axle at the points where it is flattened and so that, when the formation of the axle at these points is completed, the edges at the split 3 will be substantially in contact with each other. A mandrel 4 is inserted within the tube 2. The axle is then placed between a pair of dies 5 and 6. The lower die 6 forms a seat having a semi-cylindrical surface for receiving the axle while the upper die 5 has a flattened surface 7 that forms the bottom of the channel whose side walls have interior cylindrical surfaces 8. When, therefore, the die 5 is depressed, the central part of the upper side of the tubular axle 1 buckles inwardly, but, upon continued downward movement of the die 5, it is forced against the mandrel 4 and flattened out. During this operation, the axle wall is forced into the round corners between the cylindrical surfaces 8 and the plane surface 7 of the die 5. If a reinforcing tube 2 is to be incorporated within the axle, a similar action will take place in the inner tube 2. The surfaces, however, that connect the flattened portions 9 of the axle that are thus formed will be curved and vary in their curvature progressively as the surfaces which form the plane surfaces 9 to the cylindrical surfaces of the body portion of the tube. Since the tubes 2 over-extend the length of the flattened portions 9, they are also provided with surfaces that conform to the interior surfaces of the axle and, thus, cooperate in the transmission of all strains that may be exerted by reason of the rigid securement of the axle to the springs of the vehicle and the connection of the ends of the axle to the directing wheels of the vehicle through the knuckles. When the axle has been so formed, it will be provided with a shape that, when saddles of the proper shape are clamped thereto, turning of the axle, relative to the springs under any normal load, will be prevented.

Various forms of clamping members may be utilized in making the connection with the spring. In the form of construction illustrated in Fig. 2, a pair of U-bolts 15, each having a bend 16 that conforms to the cylindricity of the body of the axle 1, extend through a saddle 17 and the ends of a pair of clamping strips 18. The U-bolts 15 are tightly drawn by means of nuts 19 that press against the ends of the strips 18. The springs 20 are located intermediate the strips 18 and the saddle 17 and thus the parts are securely connected together. The saddle 17 is shaped to conform to the upper surfaces of the axle 1 at the flattened portions and the portions contiguous thereto. Its end edge portions conform to the cylindrical surface of the axle in proximity to the flattened portions. Thus, the axle, being securely clamped at its flattened surface, is securely held against any turning movements relative to the springs.

In the form of clamping member illustrated in Fig. 3, a pair of U-bolts 25 may be used for securing the saddle 17 to the axle 1, the U-bolts 25 being bent substantially rectangularly in form so that their central parts 26 will lie flat against the tops of the springs 20. The U-bolts 25 are inserted over the tops of the springs 20, through the saddle 17 and the clamping member 27. The clamping member 27 has a cylindrical surface 28 that conforms to the cylindricity of the axle 1. The nuts 29 are then threaded onto the ends of the bolts 25 in order to clamp the parts together.

In the form shown in Figs. 7 and 8, a short saddle 30 may be used having a length, as measured in the direction of the axle, that is substantially the same as the width of the springs 20. U-bolts 25 substantially rectangular in form, such as those shown in Fig. 3, may then be placed over the springs 20 and on the outside of the saddle 30 so as to surround the springs 20 and the saddle 30. A clamping member 31, having a cylindrical surface 32, is located on the underside of the axle and the ends of the bolt protrude through the clamping member 31. Nuts 33 are then threaded on the ends of the bolts and the parts are clamped together.

If desired, a saddle 35 having the surfaces 36 and 37 that conform to the shape of the exterior surfaces of substantially the upper half of the axle at the points where the springs are to be connected to the axle may be located on the top of the axle and welded thereto, as at 38. Preferably, the saddle 35 extends beyond the flattened portion, as in the form of constuction shown in Fig. 6 so as to rest on contiguous curved parts and cylindrical portions of the body of the tube in proximity to the flattened portions 9. Relatively short U-bolts 40, bent substantially rectangular in form, so that their central parts will lie close to the springs 20, are placed over the springs 20 and inserted through openings formed in the saddle 35 and the parts are secured together by the nuts 41 that are threaded onto the ends of the bolts 40.

If desired, the axle may be provided with a plurality of flattened surfaces at each of the points where it is connected to the springs of the vehicle. In the form of construction shown in Fig. 11, the axle is made triangular or prismatic in form. The edges of the prism being within the circle of the cross section of the tube, the wall of the tube, where it is thus flattened, will be considerably thickened. The axle at these points may be also provided with reinforcing tubes 42 which will be forced into conformation with the inner surface of the axle. U-bolts 45 having central parts 46 that are located at right angles to their legs, are located on opposite sides of the springs 20 and a V-shaped clamping member 47 conforming to two of the flattened surfaces 49 of the axle is secured by the nuts 48. One of the sides 50 of the axle is thus forced against the lowermost end of the springs 20.

In the form of construction shown in Fig. 12, the axle 1 is formed substantially square in its cross sectional configuration at the points where it is to be connected to the springs and its walls at these points are correspondingly increased in thickness. The corners are located in substantially horizontal and vertical diagonals. A saddle 52 is provided with surfaces 53 that conform to two of the surfaces of the axle 1 formed by two of the flattened portions 54. A pair of U-bolts 55 is inserted over the spings 20 and through the saddle 52 and through a clamping member 56 which is also V-shaped so as to conform to the flattened portions 57 of the axle. The parts may thus be clamped together by means of the nuts 58 that are threaded onto the ends of the U-bolts 55.

The springs 20 are usually tied together by means of a bolt, such as the bolt 60. In order to provide for the bolt head so that the springs may be placed in contact with the top of the saddle, where a saddle is used, the saddle is provided with an opening 61. Preferably, the opening 61 is made the same diameter as the bolt head which also operates to lock the saddle in position and prevent any turning movement of the axle relative to the springs. Where, as in the form of construction shown in Fig. 11, the springs 20 rest directly on the flattened side portion of the axle 1, the axle 1 is provided in each case with an opening 62 having a diameter the same as the head of the bolt 60, which operates in the same manner to prevent the turning movement of the axle relative to the springs.

In the form of construction shown in Figs. 13, 14, and 15, each saddle 65 is provided with a goose-neck 66 whereby a connection may be made between a spring of a vehicle that lies substantially within the plane of the axle. In such form of construction a spring 67 is connected to the saddle 65 by means of the links or shackles 68 and the pins 69. The saddle 65 may be secured to the axle by means of the bolt 70 that extends through the flattened portions 71. The axle may also be provided with short reinforcing tubes 2 that may be constructed and formed within the axle as in the axles illustrated in Figs. 1, 2, 3, and 6. Each saddle 65 has portions 72 and 73 that extend over and fit the curved portions located contiguous to the flattened portions 71 of the axle. When, therefore, the saddle 65 is secured by the bolt 70, the surfaces of the saddle 75 substantially fit the surfaces of the flattened portions and the portions adjoining thereto, whereby the saddle is rigidly held seated on the flattened portion and the contiguous parts of the axle.

I claim:

1. In a means for connecting a tubular axle to a vehicle, the tubular vehicle axle having flattened portions, the flattened portions having substantially plane surfaces and the axle having surfaces inclined to the plane surfaces and joining the plane surfaces of the flattened portions with the cylindrical surface of the body of the axle, saddles having surfaces conforming to the flattened portions and the inclined surfaces and extending over the flattened portions and the said contiguous inclined surfaces, and means for clamping the saddle to the axle.

2. In a means for attaching a tubular vehicle axle to a vehicle, the axle having flattened surfaces inclined to each other and forming wedging surfaces, saddles having surfaces conforming to the flattened inclined portions located thereon, and means for clamping the saddle to the axle, the inclined surfaces wedging against the corresponding surfaces of the axle.

3. In a means for connecting a tubular vehicle axle to a vehicle, the tubular vehicle axle having flattened portions, the flattened portions having substantially plane surfaces and the axle having surfaces inclined to the plane surfaces and joining the plane surfaces of the flattened portions with the cylindrical surface of the body of the axle, and the axle having surfaces inclined to each other and extending from the flattened portions to the portions of the body of the axle located below the flattened portions when the axle is secured to the vehicle and forming wedging surfaces, saddles having surfaces conforming to the flattened portions and the first named inclined surfaces and the said wedging surfaces and supported on the said surfaces of the axle to increase the engagement between the saddles and the axle by weight of the load, and means for clamping parts of the vehicle and the saddle to the axle.

4. In a means for connecting a tubular vehicle axle to a vehicle, the tubular axle having inner tubes, the exterior of the inner tubes fitting the inner surface of the tubular axle, the axle having flattened portions within the lengths of the inner tubes, the flattened portions having substantially plane surfaces, and the axle having curved surfaces inclined to the plane surfaces and joining the plane surfaces of the flattened portions with the cylindrical surface of the body of the axle, saddles having surfaces conforming to the flattened portions and the inclined surfaces and extending over the flattened portions and the said contiguous inclined surfaces, and means for clamping parts of the vehicle and the saddle to the axle.

5. In a means for connecting a tubular axle to a vehicle, the tubular axle having inner tubes, the exterior of the inner tubes fitting the inner surface of the axle, the axle having flattened portions within the lengths of the inner tubes, the flattened portions having substantially plane surfaces and the axle having curved surfaces inclined to the plane surfaces and joining the plane surfaces of the flattened portions with the cylindrical surface of the body of the axle, and the axle having surfaces inclined to each other and extending from the flattened portions to the portions of the body of the axle located below the flattened portions when the axle is secured to a vehicle and forming wedging surfaces, saddles having surfaces conforming to the flattened portions and the first named inclined surfaces and the said wedging surfaces and supported on the said surfaces of the axle to increase the engagement between the saddles and the axle by weight of the load, and means for clamping parts of the vehicle and the saddle to the axle.

6. In a means for connecting a tubular axle to a vehicle, a pair of split tubes located in spaced relation within the tubular axle, the tubular axle having flattened portions at the points where the split tubes are located and inclined surfaces that joint the flattened portions with the body of the axle, the split tubes being made to conform to the inner surface of the tubular axle at the points where the tubular member is flattened, the contiguous edges of the split tube abutting each other, saddles conforming to the surfaces of the flattened portions and the inclined surfaces, and means for securing parts of the vehicle and the saddles to the axle.

7. In a means for connecting a tubular vehicle axle to a vehicle, the tubular vehicle axle having flattened portions, the flattened portions having substantially plane surfaces and the axle having surfaces inclined to the plane surfaces and joining the plane surfaces of the flattened portions with the cylindrical surface of the body of the axle, saddles having surfaces conforming to the flattened portions and the inclined surfaces and extending over the flattened portions and the said contiguous inclined surfaces, and means for clamping the saddle to the axle, the saddles having means for supporting vehicle springs extending substantially in the plane of the axle.

8. In a means for connecting a tubular vehicle axle to a vehicle, the tubular vehicle axle having flattened portions, the flattened portions having substantially plane surfaces and the axle having surfaces inclined to the plane surfaces and joining the plane surfaces of the flattened portions with the cylindrical surface of the body of the axle, and surrounding the plane surfaces of the flattened portions, saddles having surfaces conforming to the flattened portions and the inclined surfaces and extending over the flattened portions and the said contiguous inclined surfaces, and means for clamping the saddle to the axle, the saddles having goose neck portions for supporting the vehicle springs substantially in the plane of the axle.

9. In a means for connecting a tubular axle to a vehicle, the tubular vehicle axle having flattened portions, the flattened portions having substantially plane surfaces and the axle having surfaces inclined to the plane surfaces and joining the plane surfaces of the flattened portions with the cylindrical surface of the body of the axle, saddles having surfaces conforming to the flattened portions and the inclined surfaces and extending over the flattened portions and the said contiguous inclined surfaces, and the adjoining cylindrical surfaces, and means for clamping the saddle to the axle.

10. In a means for connecting a tubular axle to a vehicle, the tubular axle having inner tubes, the exterior of the inner tubes fitting the inner surface of the tubular axle, the axle having flattened portions within the lengths of the inner tubes, the flattened portions having substantially plane surfaces, and the axle having curved surfaces inclined to the plane surfaces and joining the plane surfaces of the flattened portions with the cylindrical surface of the body of the axle, saddles having surfaces conforming to the flattened portions and the inclined surfaces and extending over the flattened portions and the said contiguous inclined surfaces, and the adjoining cylindrical surfaces, and means for clamping parts of the vehicle and the saddle to the axle.

11. In a means for connecting a tubular axle to the vehicle, the tubular vehicle axle having flattened portions, the flattened portions having substantially plane surfaces and the axle having surfaces inclined to the plane surfaces and joining the plane surfaces of the flattened portions with the cylindrical surface of the body of the axle, saddles having surfaces conforming to the flattened portions and the inclined surfaces and extending over the flattened portions and the said contiguous inclined surfaces, and the adjoining cylindrical surfaces, and means for clamping the saddle to the axle, the saddles having means for supporting vehicle springs extending substantially in the plane of the axle.

In witness whereof I have hereunto signed my name to this specification.

BERTIS H. URSCHEL.